(12) United States Patent
Wada et al.

(10) Patent No.: US 11,538,639 B2
(45) Date of Patent: Dec. 27, 2022

(54) SEPARATOR FOR ELECTROCHEMICAL ELEMENTS, AND ELECTROCHEMICAL ELEMENT

(71) Applicant: NIPPON KODOSHI CORPORATION, Kochi (JP)

(72) Inventors: Norihiro Wada, Kochi (JP); Gaku Matsuoka, Kochi (JP); Takumi Ichimura, Kochi (JP); Yuhei Nishimori, Kochi (JP); Atsushi Igawa, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 187 days.

(21) Appl. No.: 16/765,522

(22) PCT Filed: Nov. 19, 2018

(86) PCT No.: PCT/JP2018/042636
§ 371 (c)(1),
(2) Date: May 20, 2020

(87) PCT Pub. No.: WO2019/102958
PCT Pub. Date: May 31, 2019

(65) Prior Publication Data
US 2020/0321161 A1 Oct. 8, 2020

(30) Foreign Application Priority Data
Nov. 21, 2017 (JP) .............................. JP2017-223300

(51) Int. Cl.
*H01G 9/02* (2006.01)
*H01G 11/52* (2013.01)
(Continued)

(52) U.S. Cl.
CPC ............... *H01G 9/02* (2013.01); *H01G 11/06* (2013.01); *H01G 11/52* (2013.01);
(Continued)

(58) Field of Classification Search
CPC ..... H01G 11/52; H01G 9/02; H01M 50/4295; H01M 50/409
See application file for complete search history.

(56) References Cited

U.S. PATENT DOCUMENTS 6,074,523 A * 6/2000 Mizobuchi ............. H01G 11/52
162/91
2008/0107959 A1 5/2008 Ishino et al.
(Continued)

FOREIGN PATENT DOCUMENTS

EP 3199701 A1 * 8/2017 ............. B32B 29/00
JP 2000-212323 A 8/2000
(Continued)

OTHER PUBLICATIONS

Jan. 29, 2019 International Search Report issued in Internaitonal Patent Application No. PCT/JP2018/042636.
(Continued)

*Primary Examiner* — David M Sinclair
(74) *Attorney, Agent, or Firm* — Oliff PLC (57) ABSTRACT

A thin separator for electrochemical elements, which has achieved chemical stability, while maintaining a good balance among short-circuit resistance, resistivity, electrolyte solution impregnability and electrolyte solution retainability of the separator. A separator for electrochemical elements, which is interposed between a pair of electrodes so as to separate the electrodes from each other, and which holds an electrolyte solution. This separator for electrochemical elements is composed of beaten cellulose fibers and thermoplastic synthetic fibers, and has a thickness of 5.0-30.0 μm (Continued)

and a density of 0.50-0.75 g/cm³; and the thickness X (μm) and the air resistance Y (second/100 ml) of this separator for electrochemical elements satisfy formula 1:

$$Y \geq 0.01X^2 - 0.6X + 11.5.$$

6 Claims, 1 Drawing Sheet

(51) Int. Cl.
*H01G 11/06* (2013.01)
*H01M 10/0525* (2010.01)
*H01M 50/44* (2021.01)
*H01M 50/429* (2021.01)

(52) U.S. Cl.
CPC ... *H01M 10/0525* (2013.01); *H01M 50/4295* (2021.01); *H01M 50/44* (2021.01)

(56) References Cited

U.S. PATENT DOCUMENTS

| | | | |
|---|---|---|---|
| 2010/0252426 | A1 | 10/2010 | Tsukuda et al. |
| 2011/0206972 | A1* | 8/2011 | Hashimoto ............ H01G 11/52 429/144 |
| 2015/0079479 | A1* | 3/2015 | Hayakawa .......... H01M 50/446 429/252 |
| 2018/0287119 | A1 | 10/2018 | Igawa et al. |

FOREIGN PATENT DOCUMENTS

| | | | |
|---|---|---|---|
| JP | 2011-82148 A | | 4/2011 |
| JP | 2015-61036 A | | 3/2015 |
| JP | 2016072309 A | * | 5/2016 |
| JP | 2017-069229 A | | 4/2017 |
| JP | 2017-117590 A | | 6/2017 |
| TW | 201727972 A | | 8/2017 |
| WO | 2012/008559 A1 | | 1/2012 |

OTHER PUBLICATIONS

Oct. 1, 2021 Extended Search Report issued in European Patent Application No. 18880409.0.

* cited by examiner

SEPARATOR FOR ELECTROCHEMICAL ELEMENTS, AND ELECTROCHEMICAL ELEMENT

TECHNICAL FIELD

The present invention relates to a separator for electrochemical elements and an electrochemical element using the separator for electrochemical elements.

BACKGROUND ART

Examples of the electrochemical element include an aluminum electrolytic capacitor, a conductive polymer aluminum solid electrolytic capacitor, a conductive polymer hybrid aluminum electrolytic capacitor, an electric double layer capacitor, a lithium ion capacitor, a lithium ion secondary battery, and a lithium primary battery. These electrochemical elements have been adopted in many fields, for example, automobile-related devices, digital devices, devices related to renewable energy such as wind power generation or photovoltaic power generation, and a communication device such as a smart meter. It is expected that the market of the electrochemical elements and use thereof will expand.

For example, in an electric automobile and a hybrid automobile that have been attracting attention in recent years, a lithium ion secondary battery is used as a power supply and the like, an electric double layer capacitor is used for energy regeneration and the like, and an aluminum electrolytic capacitor is used for a battery serving as a power supply, controlling a hybrid system, and an electronic control unit for performing direct current conversion from an external alternating current power supply, and the like. Such an electrochemical element used for an automobile requires high reliability because a defect thereof may affect a human life. In other words, the electrochemical element requires to withstand vibration of a vehicle body, not to cause short-circuit failure even in long-time use in a cold region or a high-temperature region, and to reduce performance deterioration.

In a circuit board used for an electronic device, there is a large demand for reducing the thickness and the height of an electrochemical element to be mounted. For this reason, an electrochemical element such as an aluminum electrolytic capacitor is mounted on the circuit board in order to supply power to an integrated circuit or a chip around the circuit and to smooth an alternating current, and the electrochemical element also requires to have a low height and a small size.

A portable device requires to be able to be used for a long time with a single charge. A lithium ion secondary battery which is often used as a power supply for a portable device requires to be thinner and to have higher capacity and less performance deterioration even after repeated charge/discharge so as to be able to withstand long-term use.

With the above-described use and higher performance of a device used, an electrochemical element requires to reduce characteristic deterioration due to charge/discharge, to improve output characteristics, to improve reliability, to reduce the size, and the like more than ever.

As a separator for electrochemical elements, a nonwoven fabric separator, a polyolefin-based microporous film separator, a separator obtained by applying an inorganic substance to the nonwoven fabric separator or the polyolefin-based microporous film, and the like are used.

As the polyolefin-based microporous film separator, a polypropylene or polyethylene separator is used.

Examples of the nonwoven fabric separator include a separator using a natural cellulose fiber obtained from wood or non-wood, a separator using a regenerated cellulose fiber such as a solvent-spun cellulose fiber, a separator using a synthetic fiber such as a polyester fiber or an acrylic fiber, and a separator using a mixture thereof.

As the separator to which an inorganic substance is applied, a separator obtained by applying an inorganic powder to a nonwoven fabric obtained by forming a synthetic fiber such as a polyester fiber into a sheet by a wet papermaking method, and a separator obtained by applying an inorganic powder to a polyolefin-based microporous film have been proposed.

A main role of a separator used in an electrochemical element is to separate a pair of electrodes from each other and to retain an electrolyte solution. In order to separate the pair of electrodes from each other, the separator needs to have a shielding property. In order to improve the shielding property, a method for increasing the density of the separator and a method for increasing the thickness of the separator have been adopted.

In addition, in order to reduce the size (diameter and/or height) of the electrochemical element, to improve the capacity thereof, and to lower the resistivity thereof, a technique for reducing the thickness of the separator and a technique for reducing the density of the separator have been adopted.

In order to reduce the thickness of the separator for electrochemical elements, the thickness of a polyolefin-based microporous film separator needs to be further reduced. In order to prevent reduction in heat resistance and reduction in short-circuit resistance due to reduction in the thickness of the separator, a separator obtained by applying an inorganic powder such as aluminum oxide to a polyolefin-based microporous film separator has been proposed.

Meanwhile, in order to reduce the thickness of the nonwoven fabric separator, a method for performing papermaking by reducing the thickness at the time of manufacturing the separator (at the time of papermaking), or a method for crushing the separator after papermaking by linear pressure with a press to reduce the thickness has been proposed.

In order to improve performance of a separator, for example, techniques of Patent Literatures 1 to 5 are disclosed.

CITATION LIST

Patent Literature

Patent Literature 1: JP 2000-212323 A
Patent Literature 2: JP 2017-69229 A
Patent Literature 3: WO 2012/008559 A
Patent Literature 4: JP 2017-117590 A
Patent Literature 5: JP 2011-82148 A

SUMMARY OF INVENTION

Technical Problem

Patent Literature 1 proposes a polyolefin-based microporous film separator for a lithium ion secondary battery. Since the polyolefin-based microporous film is manufactured by a method such as stretching a film, the thickness thereof can be reduced more easily than a nonwoven fabric formed by deposition of fibers. However, the polyolefin-based microporous film shrinks and closes micropores in a temperature environment equal to or higher than the melting point of a polyolefin-based resin such as polypropylene or polyethylene, and inhibits movement of electrolyte ions inside an electrochemical element. In addition, unlike the nonwoven fabric formed by deposition of fibers, many pores of the microporous film penetrate the microporous film from one surface to the other. For this reason, when the thickness of the separator is reduced, there is no physical shield, and short-circuit resistance is reduced. A polyolefin-based resin used for such a microporous film has a low affinity of a raw material itself for an electrolyte solution, and therefore has low impregnability with the electrolyte solution and low retainability of the electrolyte solution.

Patent Literature 2 proposes a separator for electrochemical elements, made of a beaten solvent-spun cellulose fiber. The cellulose fiber has high heat resistance and high affinity for an electrolyte solution, and is an optimal material as a material constituting a separator for electrochemical elements. When the thickness of a cellulose-based separator is reduced by a papermaking method, a method for reducing the thickness of the separator by micronizing a cellulose fiber as a raw material by beating or the like is adopted. However, by this method, when water interposed between the cellulose fibers is removed, voids are generated between the fibers due to repulsion between the cellulose fibers, and it is difficult to increase a filling ratio to a certain level or more. Here, when the fiber as a raw material is beaten and fibrillation is further advanced to increase the density of the sheet, resistivity increases. For example, as disclosed in Example 4 and the like of Patent Literature 2, there is also a method for reducing the thickness by adjusting the thickness of (calendering) a cellulose-based separator. However, by this method, even if short-circuit resistance is improved, resistivity is increased, and the impregnability and the retainability of an electrolyte solution are deteriorated.

Furthermore, in recent years, with expansion of use of an electrochemical element and improvement in performance thereof, there has been a case where a separator requires to have higher performance. Specifically, the separator needs to withstand an acidic environment near an electrode of the electrochemical element.

An electrolyte containing fluorine is widely used as an electrolyte solution for the electrochemical element.

This electrolyte is decomposed when water is present in the system of the electrochemical element to generate hydrofluoric acid. Although an electrode material and a separator are used after being dried in advance (preliminary dried), it is difficult to completely remove water. Therefore, water may be introduced into the system. As a result of recent efforts to increase the voltage of the electrochemical element, it has been found that when the electrochemical element is used at a high voltage, the acidity near a positive electrode increases due to stronger polarization of the electrolyte solution than use at a normal voltage, and a cellulose fiber constituting the separator may be decomposed. For this reason, the separator requires to have improved reliability such as physical and chemical stability that can withstand long-term use even at a high voltage.

Patent Literature 3 proposes a separator for a lithium ion secondary battery, made of a synthetic fiber and a solvent-spun cellulose fiber whose freeness and fiber lengths are controlled. This separator is a separator in which a beaten solvent-spun cellulose fiber and a synthetic fiber are uniformly entangled, and has a strong separator strength. A technique has been disclosed in which variations in discharge characteristics of the lithium ion secondary battery are suppressed by use of this separator to improve cycle characteristics.

However, in this separator, in order to maintain the strength thereof, the solvent-spun cellulose fiber needs to have a length that can be entangled with a synthetic fiber, and the degree of micronization of the solvent-spun cellulose fiber is low. Furthermore, the interposition of the synthetic fiber between the cellulose fibers inhibits a hydrogen bond between the cellulose fibers. For this reason, as compared with a separator made of only a cellulose fiber as disclosed in Patent Literature 2, it cannot be said that the separator disclosed in Patent Literature 3 has a high shielding property. Particularly when the separator disclosed in Patent Literature 3 has such a thin thickness as recently required, an electrochemical element using this separator may cause short-circuit failure. If the solvent-spun cellulose fiber is further beaten in order to improve the shielding property of the separator, entanglement between the solvent-spun cellulose fiber and the synthetic fiber is reduced, and the separator strength is significantly reduced.

In addition, a synthetic fiber used for papermaking has a relatively large fiber diameter. Therefore, it is difficult to reduce the thickness of a nonwoven fabric manufactured by deposition of fibers. If the thickness is reduced by thickness adjustment, resistivity increases, and the impregnability and the retainability of an electrolyte solution are deteriorated as in the case where the thickness is reduced by thickness adjustment in Patent Literature 2.

Patent Literature 4 discloses a technique for increasing the shielding property, the mechanical strength, and the chemical stability of a separator for electrochemical elements by unevenly distributing a thermoplastic synthetic fiber and a regenerated cellulose fiber in a thickness direction of the separator.

In the separator of Patent Literature 4, the cellulose fiber and the synthetic fiber are unevenly distributed. As a result, as compared with a separator in which a cellulose fiber and a synthetic fiber are uniformly entangled as in Patent Literature 3, the separator of Patent Literature 4 separates roles of portions such as a portion that secures strength and a portion that secures denseness from each other, and enhances both the strength and the denseness.

However, in recent years, a separator having a higher shielding property has been required.

When the cellulose fiber is excessively micronized in order to improve the shielding property of the separator of Patent Literature 4, falling of the micronized cellulose fiber from a papermaking network increases during formation of the separator, and an uneven distribution of the cellulose fiber and the synthetic fiber is difficult. Therefore, it is difficult to significantly improve the shielding property of the separator of Patent Literature 4.

Even if the thickness of the separator is adjusted to increase the density, there is a limit to improvement of the shielding property of the separator. It is considered that this is because the thickness adjustment is pressure compression in a thickness direction of the separator, and there is no effect on the denseness of the separator in a plane direction (direction of the cross section of the separator perpendicular to the thickness direction) even if the denseness of the separator in the thickness direction is improved.

Patent Literature 5 proposes a separator for a lithium ion secondary battery, in which an inorganic layer is formed by applying an inorganic powder to a nonwoven fabric made of a polyester-based fiber.

A synthetic fiber used for papermaking has a relatively large fiber diameter. Therefore, it is difficult to reduce the thickness of a nonwoven fabric manufactured by deposition of fibers. If the thickness of the separator is reduced by heating or compression after papermaking, the synthetic fibers are press-bonded to each other, and the press-bonded portion is fused to be formed into a film shape, thereby increasing the resistivity of the separator. For this reason, it is difficult to reduce the thickness of such a separator. Here, even if short-circuit resistance is ensured in an inorganic layer (coating layer), and the thickness of a nonwoven fabric layer (base material layer) is reduced (the amount of deposited fibers is reduced) to the utmost limit, the thickness of the coating layer that can ensure short-circuit resistance is added to the thickness of the base material layer, and therefore it is difficult to reduce the thickness. In addition, in the separator to which the inorganic layer is applied, there is a concern that inorganic fine particles may fall off due to friction of a surface of the separator.

As described above, it is difficult to provide a thin separator for electrochemical elements, having chemical stability while maintaining a good balance among the short-circuit resistance, the resistivity, the electrolyte solution impregnability, and the electrolyte solution retainability of the separator in order to reduce the size of the electrochemical element.

Solution to Problem

The present invention has been achieved in view of the above-described problems, and provides a separator for electrochemical elements, which has achieved reduction in thickness while maintaining a balance among the chemical stability, the resistivity, the electrolyte solution impregnability, and the electrolyte solution retainability of the separator, and has improved the shielding property thereof. In addition, by using the separator for electrochemical elements, an electrochemical element having a reduced diameter and a reduced height is provided.

The present invention specifically has the following configuration.

That is, the separator for electrochemical elements according to the present invention includes a beaten cellulose fiber and a thermoplastic synthetic fiber, and is characterized in that the separator has a thickness of 5.0 to 30.0 μm and a density of 0.50 to 0.75 g/cm³, and a thickness X (μm) and an air resistance Y (second/100 ml) satisfy the following formula 1.

$$Y \geq 0.01X^2 - 0.6X + 11.5 \qquad \text{Formula 1:}$$

The separator is preferably characterized in that the content of the cellulose fiber in the fibers is 50 to 90% by mass, and the content of the thermoplastic synthetic fiber is 10 to 50% by mass.

The separator is preferably characterized in that the thickness X (μm) and the air resistance Y (second/100 ml) further satisfy the following formula (2).

$$Y \geq 0.02X^2 - 1.2X + 22.5 \qquad \text{Formula 2:}$$

The separator is preferably characterized in that the cellulose fiber is a solvent-spun cellulose fiber.

Furthermore, the thermoplastic synthetic fiber is preferably one or more types of fibers selected from a polyester-based fiber, a polyolefin-based fiber, and an acrylic fiber.

The electrochemical element of the present invention uses the above separator for electrochemical elements according to the present invention.

In addition, the electrochemical element of the present invention can be selected from an aluminum electrolytic capacitor, an electric double layer capacitor, a lithium ion capacitor, a lithium ion secondary battery, a sodium ion secondary battery, a sodium sulfur secondary battery, a magnesium ion secondary battery, and a magnesium sulfur secondary battery.

Advantageous Effects of Invention

According to the present invention described above, short-circuit resistance can be improved, and the thickness can be reduced without impairing the resistivity, the electrolyte solution impregnability, and the electrolyte solution retainability of the separator.

In addition, use of the separator of the present invention can contribute to reduction in the size of an electrochemical element.

DESCRIPTION OF EMBODIMENTS

A separator for electrochemical elements according to the present invention is a separator made of a beaten cellulose fiber and a thermoplastic synthetic fiber. A cellulose fiber can be formed into a desired fiber diameter, for example, by beating the fiber, or can be controlled into a desired fibril generation degree. Among the cellulose fibers, a solvent-spun cellulose fiber is more preferable from a viewpoint of reducing the resistivity of the separator. Among thermoplastic synthetic fibers, a polyester-based fiber such as polyethylene terephthalate, a polyolefin-based fiber such as polyethylene or polypropylene, and an acrylic fiber such as polyacrylonitrile are preferable from viewpoints of acid resistance, heat resistance, and suitability for papermaking.

The shielding property of the separator for electrochemical elements generally increases as the thickness increases, and decreases as the thickness decreases.

For this reason, the thickness of the separator and the shielding property thereof generally exhibit a positive correlation.

However, when the thickness of the separator is reduced in order to respond to a recent demand for reduction in the size of an electrochemical element, the shielding property of the separator is insufficient, and it is difficult to suppress short-circuit failure of the electrochemical element.

Here, when excessive micronization of fibers, thickness adjustment, and the like are performed for the purpose of simultaneously achieving improvement of the shielding property of the separator and reduction in the thickness thereof, the resistivity of the separator may increase, and the mechanical strength thereof may further decrease.

The separator for electrochemical elements according to the present invention is a separator in which a relational formula between the thickness X (μm) of the separator and the air resistance Y (second/100 ml) thereof satisfies the following formula 1, and reduction in thickness and improvement of a shielding property can be simultaneously achieved.

$$Y \geq 0.01X^2 - 0.6X + 11.5 \qquad \text{Formula 1:}$$

Furthermore, when the thickness X of the separator and the air resistance Y thereof satisfy the following formula 2, the shielding property of the separator can be further enhanced, which is more preferable.

$$Y \geq 0.02X^2 - 1.2X + 22.5 \quad \text{Formula 2:}$$

The air resistance is a period of time required for 100 ml of air to pass through a sheet in a thickness direction, and a higher air resistance indicates a denser sheet. In the present invention, the air resistance is used as an index for measuring the shielding property of the separator.

The air resistance of the separator is desirably high from a viewpoint of shielding property. However, it is considered that an upper limit of the air resistance is substantially about 40 seconds/100 ml in consideration of the density of the separator and the like.

In prior art, as described above, it is difficult to achieve both reduction in thickness and improvement of a shielding property while the resistivity and the chemical stability of the separator are maintained.

In the present invention, by controlling the air resistance of the separator and the thickness thereof, and by establishing a negative correlation between the thickness of the separator and the air resistance thereof in a predetermined thickness range as indicated in the above formula 1, both improvement of the shielding property and reduction in thickness are achieved.

The thickness of the separator of the present invention is from 5.0 to 30.0 μm.

When the thickness of the separator is less than 5.0 μm, even with the separator having a good shielding property according to the present invention, short-circuit failure of an electrochemical element cannot be suppressed in some cases.

Meanwhile, when the thickness of the separator exceeds 30.0 μm, reduction in the size of an electrochemical element, which is an object of the present invention, cannot be achieved, the resistivity of the separator increases, and the resistivity of the electrochemical element thereby also increases.

The separator of the present invention has a density of 0.50 to 0.75 g/cm³.

When the density of the separator is less than 0.50 g/cm³, a shielding property may be insufficient when the thickness of the separator is reduced.

Meanwhile, when the density exceeds 0.75 g/cm³, fibers constituting the separator may be press-bonded or fused to each other, and the resistivity of the separator may increase.

The separator of the present invention uses both a thermoplastic synthetic fiber and a beaten cellulose fiber (that is, a cellulose fiber that has been beaten).

A fiber is micronized while being fibrillated by beating (mechanical shearing treatment in water), and therefore the denseness of the separator is improved. In particular, a fine fibril can be obtained from a solvent-spun cellulose fiber. A separator using such a beaten cellulose fiber and satisfying the above formula 1 can reduce the thickness thereof while maximizing the shielding property of the separator.

In addition, the thermoplastic synthetic fiber improves the chemical stability of the separator, and stability in a severe environment such as a high-temperature environment or an acidic environment near an electrode, which is recently required for the separator, can be thereby also improved.

Since the thermoplastic synthetic fiber has no hydrogen bond, there is a risk that the mechanical strength of a sheet is reduced or the thermoplastic synthetic fiber falls off. However, in a separator using both the thermoplastic synthetic fiber and the cellulose fiber, satisfying the above formula 1, and having a thickness and a density within the above ranges, the fibers constituting the separator are very closely entangled with each other. The separator prevents reduction in the mechanical strength of the separator due to the thermoplastic synthetic fiber and falling-off of the thermoplastic resin from the separator. Furthermore, the synthetic fiber appropriately inhibits a hydrogen bond of cellulose, and an increase in the resistivity of the separator can be thereby suppressed.

In the separator of the present invention, the content of the cellulose fiber in the fibers is preferably in a range of 50 to 90% by mass, and the content of the thermoplastic synthetic fiber is preferably in a range of 10 to 50% by mass.

When the content of the cellulose fiber is less than 50% by mass and the content of the thermoplastic synthetic fiber exceeds 50% by mass, the denseness of the separator may be reduced, the shielding property of the separator cannot be improved in some cases, and falling off of the thermoplastic synthetic fiber from the separator may increase.

When the content of the cellulose fiber exceeds 90% by mass and the content of the thermoplastic synthetic fiber is less than 10% by mass, the chemical stability of the separator may decrease.

The configuration of the above-described separator for electrochemical elements according to the present invention can be manufactured, for example, by mixing a beaten cellulose fiber and a synthetic fiber to prepare a sheet, and then adjusting the thickness of the sheet by soft calendering.

In soft calendering (pressure compression by a combination of a resin roll and a metal roll), when pressure compression is performed, a resin roll is deformed very slightly, resulting in plane compression. Due to a compression on a plane, a fiber present on a pressurized plane can move relatively freely, and a stem fiber can also move slightly in a direction other than a thickness direction. For this reason, not only denseness in the thickness direction but also denseness in a plane direction can be improved. That is, even if a sheet before compression has a portion where the number of fibers is locally small, if a fiber moves by the plane compression, the denseness of the portion where the number of fibers is small can be increased. In addition, since the fiber itself has a degree of freedom due to the plane compression, deformation or pressure deterioration of the fiber itself constituting the separator is small. During pressure compression, the movement may be assisted by heating a roll.

Meanwhile, in conventional hard calendering (pressure compression by metal rolls), the metal rolls are not deformed. Therefore, linear compression occurs, a fiber constituting the separator has a degree of freedom only in the thickness direction, deformation and pressure deterioration into the fiber itself constituting the separator are large. In addition, when a roll is heated, deformation and pressure deterioration are further increased.

The sheet of the separator preferably has a smoothness of 500 to 2000 seconds.

A case where the smoothness is 500 seconds or more indicates that the denseness of the separator in the plane direction is very high. The separator having a smoothness of 500 seconds or more according to the present invention has a high denseness not only in the thickness direction but also in the plane direction, therefore does not have a through hole or a portion where denseness is locally low, and is uniformly filled with fibers. For this reason, a separator having a smoothness of 500 seconds or more can increase the air resistance, and easily satisfies the above formula (2). In addition, the separator having a high smoothness has a high denseness not only in the interior of the separator but also in the plane direction of a surface layer. For example, in a lithium ion secondary battery, a dendrite (crystal of lithium deposited in a tree or needle shape) grows from a negative electrode to a positive electrode with charge/discharge, and both electrodes may come into electrical contact with each other to cause a short circuit, or the dendrite may break through the separator to cause a short circuit. However, the separator having a high denseness in the plane direction of a surface layer according to the present invention has no local portion where no fiber is present as a starting point of growth of the dendrite. For this reason, local growth of the dendrite can be prevented, leading to improvement of short-circuit resistance of the separator. In addition, since the surface layer of the separator has a high denseness, even if there is a foreign substance such as an electrode foil powder, an electrode foil burr, or the like, a risk that the foreign substance or the electrode foil burr pierces and penetrates the separator to cause a short circuit can be reduced.

Meanwhile, when the smoothness is less than 500 seconds, it is difficult to increase the air resistance and the short-circuit resistance to a certain level or higher.

When the smoothness exceeds 2000 seconds, the thermoplastic synthetic fiber may be melted, the synthetic fibers may be fused to each other, or the synthetic fiber may be fused to the cellulose fiber. In these cases, a disadvantage may occur. For example, a surface of the separator may repel a liquid like a film, the resistivity of the electrochemical element may increase, or the impregnability and the retainability of the electrolyte solution may be reduced. Meanwhile, in the separator having a smoothness of 2000 seconds or less, the thermoplastic synthetic fiber is not melted by pressure compression, the synthetic fibers are not fused to each other, and the synthetic fiber is not fused to the cellulose fiber.

For this reason, the smoothness of the separator is preferably in a range of 500 to 2000 seconds.

Note that the smoothness in the present embodiment refers to a Bekk smoothness.

The separator preferably has a fibrillation ratio in a range of 7.0 to 20.0%.

When the fibrillation ratio of the separator is 20.0% or less, a stem fiber easily moves. The resistivity is not increased due to press-bonding of the stem fibers, and the impregnability and the retainability of the electrolyte solution are not reduced. Meanwhile, when the fibrillation ratio exceeds 20.0%, the stem fiber is firmly fixed by a fibril, and movement of the stem fiber is inhibited. When the fibrillation ratio of the separator is 7.0% or more, a fiber is appropriately micronized. Therefore, the retainability of the electrolyte solution of the separator can be improved, and the short-circuit resistance can also be improved. Meanwhile, when the fibrillation ratio is less than 7.0%, it is difficult to improve the retainability of the electrolyte solution of the separator and the short-circuit resistance.

For this reason, the fibrillation ratio of the separator is preferably in a range of 7.0 to 20.0%.

Note that the fibrillation ratio of the present embodiment refers to a value of "Fibrillation" measured using a measurement instrument defined in "JIS P 8226-2 'Pulp-Fiber length measurement method by optical automatic analysis-Part 2: Non-polarization method (ISO16065-2)'".

Hereinafter, specific Examples, Comparative Examples, and the like of the separator for electrochemical elements according to the present invention and an electrochemical element including the separator for electrochemical elements will be described in detail.

Note that in Examples, a wet-type nonwoven fabric formed by a papermaking method was used for all the separators. However, if the thickness X of the separator and the air resistance Y thereof satisfy the above formula 1, a method for forming the separator is not limited to the papermaking method. For example, a method for forming a sheet of a fiber dispersion by casting or the like may be used without any problem.

[Method for evaluating separator and electrochemical element]

Specific characteristics of a separator and an electrochemical element were evaluated under the following conditions and methods.

[Thickness]

The thickness (μm) of a separator was measured by the method for folding a sheet into ten sheets in "5.1.3 Case of measuring thickness by folding sheet" using a micrometer in "5.1.1 Measuring instrument and measuring method a) Case of using outer micrometer" defined in "JIS C 2300-2 'Electric cellulose paper-Part 2: Test method' 5.1 Thickness".

[Density]

The basis weight (g/m$^2$) of a separator in a bone dry condition was measured by the method defined in method B of "JIS C 2300-2 'Cellulosic papers for electrical purposes-Part 2: Methods of test' 7.0A Density", and the density (g/cm$^3$) of the separator was calculated.

[Air Resistance]

The air resistance of a separator was measured using a B-type tester according to the method defined in "JIS P 8117 'Paper and board-Determination of air permeance and air (medium range)-Gurley method'".

[Smoothness of Separator]

The Bekk smoothness (seconds) of a separator was measured according to "JIS P 8119 'Paper and board-Determination of smoothness by Bekk method'".

[Fibrillation ratio of separator]

A fibrillation ratio was measured using a fiber obtained by disintegrating and dispersing a separator sheet using a measurement instrument defined in "JIS P 8226-2 'Pulps-Determination of fibre length by automated optical analysis-Part 2: Unpolarized light method (ISO16065-2)'".

Specifically, a value of "Fibrillation" measured using "Kajaani Fiber Lab. 4" was adopted. The value of "Fibrillation" can be obtained by outputting a Calculated Values sheet of a measurement result of "Kajaani Fiber Lab. 4" or a text file of the measurement result.

Note that the value of "Fibrillation" refers to a numerical value (%) obtained by measuring the projected area of fibers dispersed in water, then measuring the projected area of fibrils, and dividing the projected area of the fibrils by the projected area of the fibers. In the present embodiment, the value of "Fibrillation" is defined as a fibrillation ratio.

[Electrochemical Element]

A separator was interposed between both electrode materials, and the resulting product was wound to manufactured an element winding.

The element winding and an electrolyte solution were enclosed in a case to obtain an electrochemical element. Specifically, each of electrochemical elements of an aluminum electrolytic capacitor, an electric double layer capacitor, and a lithium ion secondary battery was manufactured by the following methods.

[Method for Manufacturing Aluminum Electrolytic Capacitor]

An anode aluminum foil and a cathode aluminum foil which had been subjected to an etching treatment and an oxide film formation treatment were wound with a separator interposed therebetween to obtain an element winding of a capacitor. The element winding was impregnated with an electrolyte solution and put in a case. Then, the case was sealed to manufacture an aluminum electrolytic capacitor having a diameter of 10 mm, a height of 20 mm, a rated voltage of 63 V, and a rated capacity of 120 µF.

[Method for Manufacturing Electric Double Layer Capacitor]

An activated carbon electrode and a separator were wound to obtain an element winding of an electric double layer capacitor. The element winding was housed in a bottomed cylindrical aluminum case. Into the case, an electrolyte solution in which tetraethylammonium tetrafluoroborate as an electrolyte was dissolved in a propylene carbonate solvent was injected, and vacuum impregnation was performed. Thereafter, the case was sealed with a sealing rubber. In this way, an electric double layer capacitor having a rated voltage of 2.5 V, a capacity of 300 F, a diameter of 35 mm, and a height of 60 mm was manufactured.

[Method for Manufacturing Lithium Ion Secondary Battery]

A lithium cobalt oxide for a lithium ion secondary battery was used as a positive electrode material, and a graphite electrode was used as a negative electrode material. The electrodes were wound together with a separator to obtain an element winding of a lithium ion secondary battery. The element winding was housed in a bottomed cylindrical case. Into the case, an electrolyte solution in which lithium hexafluorophosphate as an electrolyte was dissolved in a mixed solvent of ethylene carbonate and diethyl carbonate was injected. The case was sealed with a press machine. In this way, a lithium ion secondary battery having a rated voltage of 3.7 V, a rated capacity of 3000 mAh, a diameter of 18 mm, and a height of 65 mm was manufactured.

The characteristics of each of the manufactured electrochemical elements were measured by the following methods. Note that 1000 electrochemical elements were manufactured for each example, and used for the following characteristic evaluation.

[Impregnability]

An impregnation rate was measured by the following method using the manufactured element windings.

When each of the element windings was impregnated with an electrolyte solution, a period of time from the time when the electrolyte solution was injected or when an element was immersed in the electrolyte solution until 80% of rated electrostatic capacity or rated discharge capacity was reached was measured, and impregnability was evaluated.

This measurement was performed 20 times for each of the element winding when the element windings were manufactured, and an average value thereof was defined as impregnation time. Note that the measurement was performed without performing pressure reduction and the like at the time of impregnation.

In the aluminum electrolytic capacitor, a case where the impregnation time was 4 minutes or less was evaluated as "○", a case where the impregnation time was more than 4 minutes and 6 minutes or less was evaluated as "Δ", and a case where the impregnation time was more than 6 minutes was evaluated as "x".

In the electric double layer capacitor and the lithium ion secondary battery, a case where the impregnation time was 10 minutes or less was evaluated as "○", a case where the impregnation time was more than 10 minutes and 15 minutes or less was evaluated as "Δ", and a case where the impregnation time was more than 15 minutes was evaluated as "x".

[Short-Circuit Failure Ratio]

As for a short-circuit failure ratio of an electrochemical element, a case where a charging voltage did not rise up to a rated voltage was defined as short-circuit failure, and a value obtained by dividing the number of electrochemical elements which had caused short-circuit failure by the number of electrochemical elements used for electrostatic capacity measurement, and converting the value into a percentage was defined as the short-circuit failure ratio.

[Impedance]

The impedance of the aluminum electrolytic capacitor was measured using an LCR meter at 20° C. at a frequency of 1 kHz.

[Internal Resistivity]

The internal resistivity of the electric double layer capacitor was measured by the alternating current (a.c.) resistivity method of "4.6 Internal resistivity" defined in "JIS C 5160-1 'Fixed electric double layer capacitor for use in electronic device-Part 1: Generic specification'".

The internal resistivity of the lithium ion secondary battery was measured according to "8.6.3 Alternating current internal resistivity" defined in "JIS C 8715-1 'Unit cell and battery system of industrial lithium secondary battery-Part 1: Requirements of performance'"

[Capacity Change Ratio Due to Heating]

For the purpose of measuring characteristic deterioration in a high temperature environment, a capacity change ratio of an electrochemical element due to heating was determined.

The capacity change ratio of the aluminum electrolytic capacitor due to heating was determined by the following method.

An initial electrostatic capacity was measured by the method of "4.7 Electrostatic capacity" defined in "JIS C5101-1 'Fixed capacitor for use in electronic device-Part 1: Generic specification'".

Next, the aluminum electrolytic capacitor was allowed to stand (heated) in an environment of 160° C. for 250 hours, and then an electrostatic capacity after the heat treatment was measured by the above-described method. Then, using the electrostatic capacities before and after the heat treatment, a capacity change ratio due to heating was calculated by the following formula 3.

$$C = \{1-(C1-C2)/C1\} \times 100 \quad \text{Formula 3:}$$

C: Capacity change ratio due to heating (%)
C1: Initial capacity (F)
C2: Capacity after heating (F)

The capacity change ratio of the electric double layer capacitor due to heating was determined by the following method.

An initial electrostatic capacity was measured by the constant current discharge method of "4.5 Electrostatic capacity" defined in "JIS C 5160-1 'Fixed electric double layer capacitor for use in electronic device'".

Next, the electric double layer capacitor was allowed to stand (heated) for one hour in an environment of 150° C., and then an electrostatic capacity after the heat treatment was measured by the above-described method. Then, using the electrostatic capacities before and after the heat treatment, an electrostatic capacity change ratio due to heating was calculated by formula 3.

A capacity change ratio of the lithium ion secondary battery due to heating was determined by the following method.

An initial discharge capacity was measured according to "8.4.1 Discharge performance test" defined in "JIS C 8715-1 'Unit cell and battery system of industrial lithium secondary battery-Part 1: Requirements of performance'" Next, the lithium ion secondary battery was allowed to stand (heated) for one hour in an environment of 150° C., and a discharge capacity after the heat treatment was measured by the above-described method. Then, using the discharge capacities before and after the heat treatment, a capacity change ratio due to heating was calculated by the following formula 4.

$$C=\{1-(C1-C2)/C1\}\times 100 \quad \text{Formula 4:}$$

C: Capacity change ratio due to heating (%)
C1: Initial capacity (mA)
C2: Capacity after heating (mA)

Hereinafter, specific Examples according to the present invention, Comparative Examples, and Conventional Examples will be described.

Note that a separator in each of Example used a solvent-spun cellulose fiber (hereinafter, referred to as lyocell fiber) as a cellulose fiber, and the separator was obtained by a papermaking method with a papermaking machine.

Example 1

90% by mass of lyocell fibers were beaten and mixed with 10% by mass of polyethylene terephthalate fibers (hereinafter, referred to as PET fibers) having a fiber diameter of 2.0 µm and a length of 2 mm, and the resulting mixture was subjected to Fourdrinier papermaking to obtain a sheet having a basis weight of 3.0 g/m² and a thickness of 9.0 µm. The thickness of this sheet was adjusted by soft calendering to obtain a separator having a thickness of 5.0 µm and a density of 0.60 g/cm³.

This separator had an air resistance of 17.4 seconds/100 ml, a fibrillation ratio of 7.1%, and a Bekk smoothness of 516.9 seconds.

Example 2

50% by mass of lyocell fibers were beaten and mixed with 50% by mass of PET fibers having a fiber diameter of 2.5 µm and a length of 3 mm, and the resulting mixture was subjected to Fourdrinier papermaking to obtain a sheet having a basis weight of 12.0 g/m² and a thickness of 32.5 µm. The thickness of this sheet was adjusted by soft calendering to obtain a separator having a thickness of 20.0 µm and a density of 0.60 g/cm³.

This separator had an air resistance of 6.6 seconds/100 ml, a fibrillation ratio of 9.8%, and a Bekk smoothness of 805.6 seconds.

Example 3

70% by mass of lyocell fibers were beaten and mixed with 30% by mass of PET fibers having a fiber diameter of 2.5 µm and a length of 4 mm, and the resulting mixture was subjected to Fourdrinier papermaking to obtain a sheet having a basis weight of 22.5 g/m² and a thickness of 60.0 µm. The thickness of this sheet was adjusted by soft calendering to obtain a separator having a thickness of 30.0 µm and a density of 0.75 g/cm³.

This separator had an air resistance of 37.9 seconds/100 ml, a fibrillation ratio of 14.7%, and a Bekk smoothness of 1546.7 seconds.

Example 4

75% by mass of lyocell fibers were beaten and mixed with 25% by mass of polypropylene fibers (hereinafter, referred to as PP fibers) having a fiber diameter of 15 µm and a length of 5 mm, and the resulting mixture was subjected to cylinder papermaking to obtain a sheet having a basis weight of 15.6 g/m² and a thickness of 50.0 µm. The thickness of this sheet was adjusted by soft calendering to obtain a separator having a thickness of 30.0 µm and a density of 0.52 g/cm³.

This separator had an air resistance of 4.7 seconds/100 ml, a fibrillation ratio of 8.0%, and a Bekk smoothness of 643.4 seconds.

Example 5

80% by mass of lyocell fibers were beaten and mixed with 20% by mass of acrylic fibers having a fiber diameter of 4 µm and a length of 3 mm, and the resulting mixture was subjected to Fourdrinier papermaking to obtain a sheet having a basis weight of 7.0 g/m² and a thickness of 17.0 µm. The thickness of this sheet was adjusted by soft calendering to obtain a separator having a thickness of 10.0 µm and a density of 0.70 g/cm³.

This separator had an air resistance of 13.0 seconds/100 ml, a fibrillation ratio of 12.5%, and a Bekk smoothness of 1217.8 seconds.

Example 6

75% by mass of lyocell fibers were beaten and mixed with 25% by mass of PET fibers having a fiber diameter of 2.5 µm and a length of 3 mm, and the resulting mixture was subjected to Fourdrinier papermaking to obtain a sheet having a basis weight of 4.2 g/m² and a thickness of 10.0 µm. The thickness of this sheet was adjusted by soft calendering to obtain a separator having a thickness of 6.0 µm and a density of 0.70 g/cm³.

This separator had an air resistance of 38.4 seconds/100 ml, a fibrillation ratio of 19.8%, and a Bekk smoothness of 1922.3 seconds.

Example 7

75% by mass of lyocell fibers were beaten and mixed with 25% by mass of PET fibers having a fiber diameter of 2.5 µm and a length of 3 mm, and the resulting mixture was subjected to Fourdrinier papermaking to obtain a sheet having a basis weight of 10.2 g/m² and a thickness of 25.0 µm. The thickness of this sheet was adjusted by soft calendering to obtain a separator having a thickness of 15.0 µm and a density of 0.68 g/cm³.

This separator had an air resistance of 33.6 seconds/100 ml, a fibrillation ratio of 17.6%, and a Bekk smoothness of 1721.2 seconds.

Example 8

70% by mass of lyocell fibers were beaten and mixed with 30% by mass of PET fibers having a fiber diameter of 2.5 µm and a length of 3 mm, and the resulting mixture was subjected to Fourdrinier papermaking to obtain a sheet having a basis weight of 12.0 g/m² and a thickness of 30.0 μm. The thickness of this sheet was adjusted by soft calendering to obtain a separator having a thickness of 20.0 μm and a density of 0.60 g/cm³.

This separator had an air resistance of 22.0 seconds/100 ml, a fibrillation ratio of 11.3%, and a Bekk smoothness of 1096.7 seconds.

Example 9

70% by mass of lyocell fibers were beaten and mixed with 30% by mass of PET fibers having a fiber diameter of 3 μm and a length of 3 mm, and the resulting mixture was subjected to Fourdrinier papermaking to obtain a sheet having a basis weight of 17.5 g/m² and a thickness of 42.5 μm. The thickness of this sheet was adjusted by soft calendering to obtain a separator having a thickness of 25.0 μm and a density of 0.70 g/cm³.

This separator had an air resistance of 27.9 seconds/100 ml, a fibrillation ratio of 13.9%, and a Bekk smoothness of 993.1 seconds.

Example 10

75% by mass of lyocell fibers were beaten and mixed with 25% by mass of PET fibers having a fiber diameter of 2 μm and a length of 2 mm, and the resulting mixture was subjected to Fourdrinier papermaking to obtain a sheet having a basis weight of 3.3 g/m² and a thickness of 9.5 μm. The thickness of this sheet was adjusted by soft calendering to obtain a separator having a thickness of 6.0 μm and a density of 0.55 g/cm³.

This separator had an air resistance of 10.0 seconds/100 ml, a fibrillation ratio of 18.5%, and a Bekk smoothness of 432.0 seconds.

Example 11

70% by mass of lyocell fibers were beaten and mixed with 30% by mass of PET fibers having a fiber diameter of 2.5 μm and a length of 3 mm, and the resulting mixture was subjected to Fourdrinier papermaking to obtain a sheet having a basis weight of 9.0 g/m² and a thickness of 23.0 μm. The thickness of this sheet was adjusted by soft calendering to obtain a separator having a thickness of 15.0 μm and a density of 0.60 g/cm³.

This separator had an air resistance of 6.0 seconds/100 ml, a fibrillation ratio of 12.2%, and a Bekk smoothness of 467.9 seconds.

Example 12

70% by mass of lyocell fibers were beaten and mixed with 30% by mass of PET fibers having a fiber diameter of 3 μm and a length of 3 mm, and the resulting mixture was subjected to cylinder papermaking to obtain a sheet having a basis weight of 12.5 g/m² and a thickness of 35.0 μm. The thickness of this sheet was adjusted by soft calendering to obtain a separator having a thickness of 25.0 μm and a density of 0.50 g/cm³.

This separator had an air resistance of 3.1 seconds/100 ml, a fibrillation ratio of 9.5%, and a Bekk smoothness of 401.2 seconds.

Comparative Example 1

30% by mass of lyocell fibers were beaten and mixed with 70% by mass of PET fibers having a fiber diameter of 3 μm and a length of 3 mm, and the resulting mixture was subjected to Fourdrinier papermaking to obtain a sheet having a basis weight of 19.5 g/m² and a thickness of 45.0 μm. The thickness of this sheet was adjusted by soft calendering to obtain a separator having a thickness of 30.0 μm and a density of 0.65 g/cm³.

This separator had an air resistance of 16.9 seconds/100 ml, a fibrillation ratio of 9.4%, and a Bekk smoothness of 2361.1 seconds.

Comparative Example 2

70% by mass of lyocell fibers were beaten and mixed with 30% by mass of PET fibers having a fiber diameter of 3 μm and a length of 3 mm, and the resulting mixture was subjected to Fourdrinier papermaking to obtain a sheet having a basis weight of 19.3 g/m² and a thickness of 45.5 μm. The thickness of this sheet was adjusted by soft calendering to obtain a separator having a thickness of 35.0 μm and a density of 0.55 g/cm³.

This separator had an air resistance of 5.4 seconds/100 ml, a fibrillation ratio of 5.5%, and a Bekk smoothness of 703.0 seconds.

Comparative Example 3

70% by mass of lyocell fibers were beaten and mixed with 30% by mass of PET fibers having a fiber diameter of 2 μm and a length of 3 mm, and the resulting mixture was subjected to Fourdrinier papermaking to obtain a sheet having a basis weight of 1.8 g/m² and a thickness of 5.0 μm. The thickness of this sheet was adjusted by soft calendering to obtain a separator having a thickness of 3.0 μm and a density of 0.60 g/cm³.

This separator had an air resistance of 13.0 seconds/100 ml, a fibrillation ratio of 13.5%, and a Bekk smoothness of 1512.5 seconds.

Comparative Example 4

70% by mass of lyocell fibers were beaten and mixed with 30% by mass of PET fibers having a fiber diameter of 3 μm and a length of 3 mm, and the resulting mixture was subjected to cylinder papermaking to obtain a sheet having a basis weight of 15.0 g/m² and a thickness of 40.0 μm. The thickness of this sheet was adjusted by soft calendering to obtain a separator having a thickness of 25.0 μm and a density of 0.60 g/cm³.

This separator had an air resistance of 1.6 seconds/100 ml, a fibrillation ratio of 12.3%, and a Bekk smoothness of 1269.7 seconds.

Comparative Example 5

70% by mass of lyocell fibers were beaten and mixed with 30% by mass of PET fibers having a fiber diameter of 3 μm and a length of 3 mm, and the resulting mixture was subjected to cylinder papermaking to obtain a sheet having a basis weight of 10.5 g/m² and a thickness of 25.5 μm. The thickness of this sheet was adjusted by soft calendering to obtain a separator having a thickness of 15.0 μm and a density of 0.70 g/cm³.

This separator had an air resistance of 3.1 seconds/100 ml, a fibrillation ratio of 16.6%, and a Bekk smoothness of 1013.5 seconds.

Comparative Example 6

70% by mass of lyocell fibers were beaten and mixed with 30% by mass of PET fibers having a fiber diameter of 3 μm and a length of 3 mm, and the resulting mixture was subjected to Fourdrinier papermaking to obtain a sheet having a basis weight of 6.0 g/m² and a thickness of 15.5 μm. The thickness of this sheet was adjusted by soft calendering to obtain a separator having a thickness of 10.0 μm and a density of 0.60 g/cm³.

This separator had an air resistance of 5.5 seconds/100 ml, a fibrillation ratio of 7.7%, and a Bekk smoothness of 612.0 seconds.

Comparative Example 7

70% by mass of lyocell fibers were beaten and mixed with 30% by mass of PET fibers having a fiber diameter of 3 μm and a length of 3 mm, and the resulting mixture was subjected to Fourdrinier papermaking to obtain a sheet having a basis weight of 2.3 g/m² and a thickness of 6.5 μm. The thickness of this sheet was adjusted by soft calendering to obtain a separator having a thickness of 3.0 μm and a density of 0.75 g/cm³.

This separator had an air resistance of 38.9 seconds/100 ml, a fibrillation ratio of 19.5%, and a Bekk smoothness of 1997.3 seconds.

Conventional Example 1

Lyocell fibers were beaten to a high degree and subjected to cylinder papermaking to obtain a separator having a thickness of 30.0 μm and a density of 0.40 g/cm³.

This separator had an air resistance of 2.1 seconds/100 ml, a fibrillation ratio of 21.2%, and a Bekk smoothness of 115.3 seconds.

Note that this separator was formed only by papermaking, and was not subjected to thickness adjustment.

Conventional Example 2

The thickness of the separator in Conventional Example 1 was adjusted by soft calendering to obtain a separator having a thickness of 20.0 μm and a density of 0.60 g/cm³.

This separator had an air resistance of 3.3 seconds/100 ml, a fibrillation ratio of 21.2%, and a Bekk smoothness of 321.1 seconds.

Conventional Example 3

70% by mass of lyocell fibers were beaten and mixed with 30% by mass of PET fibers having a fiber diameter of 2.5 μm and a length of 3 mm, and the resulting mixture was subjected to Fourdrinier papermaking to obtain a separator having a thickness of 30.0 μm and a density of 0.40 g/cm³.

This separator had an air resistance of 4.7 seconds/100 ml, a fibrillation ratio of 25.5%, and a Bekk smoothness of 112.3 seconds.

Conventional Example 4

70% by mass of lyocell fibers were beaten and mixed with 30% by mass of PET fibers having a fiber diameter of 2.5 μm and a length of 2 mm, and the resulting mixture was subjected to Fourdrinier papermaking to obtain a sheet having a basis weight of 30.0 g/m² and a thickness of 75.0 μm. The thickness of this sheet was adjusted by hard calendering to obtain a separator having a thickness of 30.0 μm and a density of 1.00 g/cm³.

This separator had an air resistance of 31.2 seconds/100 ml, a fibrillation ratio of 8.3%, and a Bekk smoothness of 1646.5 seconds.

Conventional Example 5

A polyethylene microporous film having a thickness of 30.0 μm and a basis weight of 19 g/m² was used as a separator. This separator had a density of 0.63 g/cm³.

Since this separator is not a separator made of fibers, the fibrillation ratio thereof cannot be measured. This separator had an air resistance of 135.1 seconds/100 ml and a Bekk smoothness of 6764.8 seconds.

Conventional Example 6

The separator in Conventional Example 4 was used as a base material, and an aluminum oxide powder was applied to both surfaces of the base material and dried to obtain a separator having a thickness of 35.0 μm and a density of 0.81 g/cm³. Note that a polyvinylidene fluoride binder was used in order to cause the base material to hold the aluminum oxide powder.

Since this separator is obtained by disposing an inorganic layer in the separator in Conventional Example 4, the fibrillation ratio thereof was not measured. This separator had an air resistance of 169.0 seconds/100 ml. The Bekk smoothness could not be measured accurately because the inorganic powder gradually fell off during the measurement.

Table 1 illustrates evaluation results of the separators in Examples, Comparative Examples, and Conventional Examples.

Table 2 illustrates evaluation results of electrochemical elements manufactured using the separators in the examples.

TABLE 1

| | | Separator | | | | |
| --- | --- | --- | --- | --- | --- | --- |
| | Content of fibers % | Thickness μm | Density g/cm³ | Air resistance Seconds/100 ml | Fibrillation ratio % | Bekk smoothness Seconds |
| Example1 | Lyocell90 PET10 | 5 | 0.60 | 17.4 | 7.1 | 516.9 |
| Example2 | Lyocell50 PET50 | 20 | 0.60 | 6.6 | 9.8 | 805.6 |
| Example3 | Lyocell70 PET30 | 30 | 0.75 | 37.9 | 14.7 | 1546.7 |
| Example4 | Lyocell75 PP25 | 30 | 0.52 | 4.7 | 8.0 | 643.4 |
| Example5 | Lyocell80 Acrylic20 | 10 | 0.70 | 13.0 | 12.5 | 1217.8 |
| Example6 | Lyocell75 PET25 | 6 | 0.70 | 38.4 | 19.8 | 1922.3 |

TABLE 1-continued

| | Separator | | | | | |
|---|---|---|---|---|---|---|
| | Content of fibers % | Thickness μm | Density g/cm³ | Air resistance Seconds/100 ml | Fibrillation ratio % | Bekk smoothness Seconds |
| Example7 | Lyocell75 PET25 | 15 | 0.68 | 33.6 | 17.6 | 1721.2 |
| Example8 | Lyocell70 PET30 | 20 | 0.60 | 22.0 | 11.3 | 1096.7 |
| Example9 | Lyocell70 PET30 | 25 | 0.70 | 27.9 | 13.9 | 993.1 |
| Example10 | Lyocell75 PET25 | 6 | 0.55 | 10.0 | 18.5 | 432.0 |
| Example11 | Lyocell70 PET30 | 15 | 0.60 | 6.0 | 12.2 | 467.9 |
| Example12 | Lyocell70 PET30 | 25 | 0.50 | 3.1 | 9.5 | 401.2 |
| Comparative Example1 | Lyocell30 PET70 | 30 | 0.65 | 16.9 | 9.4 | 2361.1 |
| Comparative Example2 | Lyocell70 PET30 | 35 | 0.55 | 5.4 | 5.5 | 703.0 |
| Comparative Example3 | Lyocell70 PET30 | 3 | 0.60 | 13.0 | 13.5 | 1512.5 |
| Comparative Example4 | Lyocell70 PET30 | 25 | 0.60 | 1.6 | 12.3 | 1269.7 |
| Comparative Example5 | Lyocell70 PET30 | 15 | 0.70 | 3.1 | 16.6 | 1013.5 |
| Comparative Example6 | Lyocell70 PET30 | 10 | 0.60 | 5.5 | 7.7 | 612.0 |
| Comparative Example7 | Lyocell70 PET30 | 3 | 0.75 | 38.9 | 19.5 | 1997.3 |
| Conventional Example1 | Lyocell100 | 30 | 0.40 | 2.1 | 21.2 | 115.3 |
| Conventional Example2 | Lyocell100 | 20 | 0.60 | 3.3 | 21.2 | 321.1 |
| Conventional Example3 | Lyocell70 PET30 | 30 | 0.40 | 4.7 | 25.5 | 112.3 |
| Conventional Example4 | Lyocell70 PET30 | 30 | 1.00 | 31.2 | 8.3 | 1646.5 |
| Conventional Example5 | — | 30 | 0.63 | 135.1 | — | 6764.8 |
| Conventional Example6 | — | 35 | 0.81 | 169.0 | — | — |

| | Aluminum electrolytic capacitor | | | | Electric double layer capacitor | | | | Lithium ion secondary battery | | | |
|---|---|---|---|---|---|---|---|---|---|---|---|---|
| | Short-circuit failure ratio % | Impedance mΩ | Impregnatability | Capacity change ratio after heating % | Short-circuit failure ratio % | Internal resistivity mΩ | Impregnatability | Capacity change ratio after heating % | Short-circuit failure ratio % | Internal resistivity mΩ | Impregnatability | Capacity change ratio after heating % |
| Example1 | 0 | 112 | ○ | 10 | 0 | 0.30 | ○ | 10 | 0 | 45 | ○ | 14 |
| Example2 | 0 | 124 | ○ | 8 | 0 | 0.36 | ○ | 9 | 0 | 50 | ○ | 12 |
| Example3 | 0 | 135 | ○ | 9 | 0 | 0.40 | ○ | 9 | 0 | 57 | ○ | 14 |
| Example4 | 0 | 125 | ○ | 8 | 0 | 0.38 | ○ | 7 | 0 | 52 | ○ | 11 |
| Example5 | 0 | 119 | ○ | 7 | 0 | 0.33 | ○ | 7 | 0 | 48 | ○ | 10 |
| Example6 | 0 | 113 | ○ | 11 | 0 | 0.31 | ○ | 11 | 0 | 45 | ○ | 17 |
| Example7 | 0 | 129 | ○ | 10 | 0 | 0.39 | ○ | 10 | 0 | 52 | ○ | 16 |
| Example8 | 0 | 120 | ○ | 7 | 0 | 0.35 | ○ | 7 | 0 | 49 | ○ | 12 |
| Example9 | 0 | 130 | ○ | 8 | 0 | 0.47 | ○ | 8 | 0 | 55 | ○ | 11 |
| Example10 | 0 | 102 | ○ | 15 | 0.3 | 0.25 | ○ | 15 | 0.4 | 39 | ○ | 23 |
| Example11 | 0 | 105 | ○ | 11 | 0.3 | 0.26 | ○ | 11 | 0.2 | 40 | ○ | 18 |
| Example12 | 0 | 109 | ○ | 16 | 0.1 | 0.29 | ○ | 16 | 0.1 | 42 | ○ | 24 |
| Comparative Example1 | 2.3 | 221 | △ | 22 | 3.1 | 0.60 | △ | 25 | 4.6 | 90 | △ | 34 |
| Comparative Example2 | 0.1 | 230 | ○ | 20 | 0.5 | 0.62 | ○ | 20 | 0.5 | 90 | ○ | 30 |
| Comparative Example3 | 1.9 | 116 | ○ | 9 | 2.5 | 0.31 | ○ | 7 | 4.4 | 47 | ○ | 16 |
| Comparative Example4 | 0.3 | 114 | ○ | 9 | 0.6 | 0.30 | ○ | 8 | 0.6 | 46 | ○ | 18 |
| Comparative | 0.2 | 112 | ○ | 9 | 0.9 | 0.31 | ○ | 8 | 0.8 | 46 | ○ | 18 |

-continued

| | Aluminum electrolytic capacitor | | | | Electric double layer capacitor | | | | Lithium ion secondary battery | | | |
|---|---|---|---|---|---|---|---|---|---|---|---|---|
| | Short-circuit failure ratio % | Impedance mΩ | Impregnatability — | Capacity change ratio after heating % | Short-circuit failure ratio % | Internal resistivity mΩ | Impregnatability — | Capacity change ratio after heating % | Short-circuit failure ratio % | Internal resistivity mΩ | Impregnatability — | Capacity change ratio after heating % |
| Example5 Comparative Example6 | 0.7 | 111 | ○ | 8 | 1.1 | 0.30 | ○ | 7 | 1.0 | 45 | ○ | 17 |
| Comparative Example7 | 1.3 | 122 | ○ | 8 | 1.7 | 0.36 | ○ | 7 | 3.2 | 53 | ○ | 17 |
| Conventional Example1 | 0 | 190 | Δ | 23 | 0.7 | 0.58 | Δ | 24 | 1.1 | 89 | Δ | 31 |
| Conventional Example2 | 0 | 202 | Δ | 23 | 0.5 | 0.61 | Δ | 23 | 0.6 | 95 | Δ | 31 |
| Conventional Example3 | 0 | 182 | ○ | 20 | 0.9 | 0.55 | ○ | 19 | 2 | 84 | ○ | 30 |
| Conventional Example4 | 0 | 280 | × | 29 | 0 | 0.71 | × | 26 | 0 | 92 | × | 33 |
| Conventional Example5 | 0 | 245 | × | — | 0 | 0.75 | × | — | 0 | 95 | × | — |
| Conventional Example6 | 0 | 295 | × | — | 0 | 0.84 | × | — | 0 | 106 | × | — |

Figure 1:
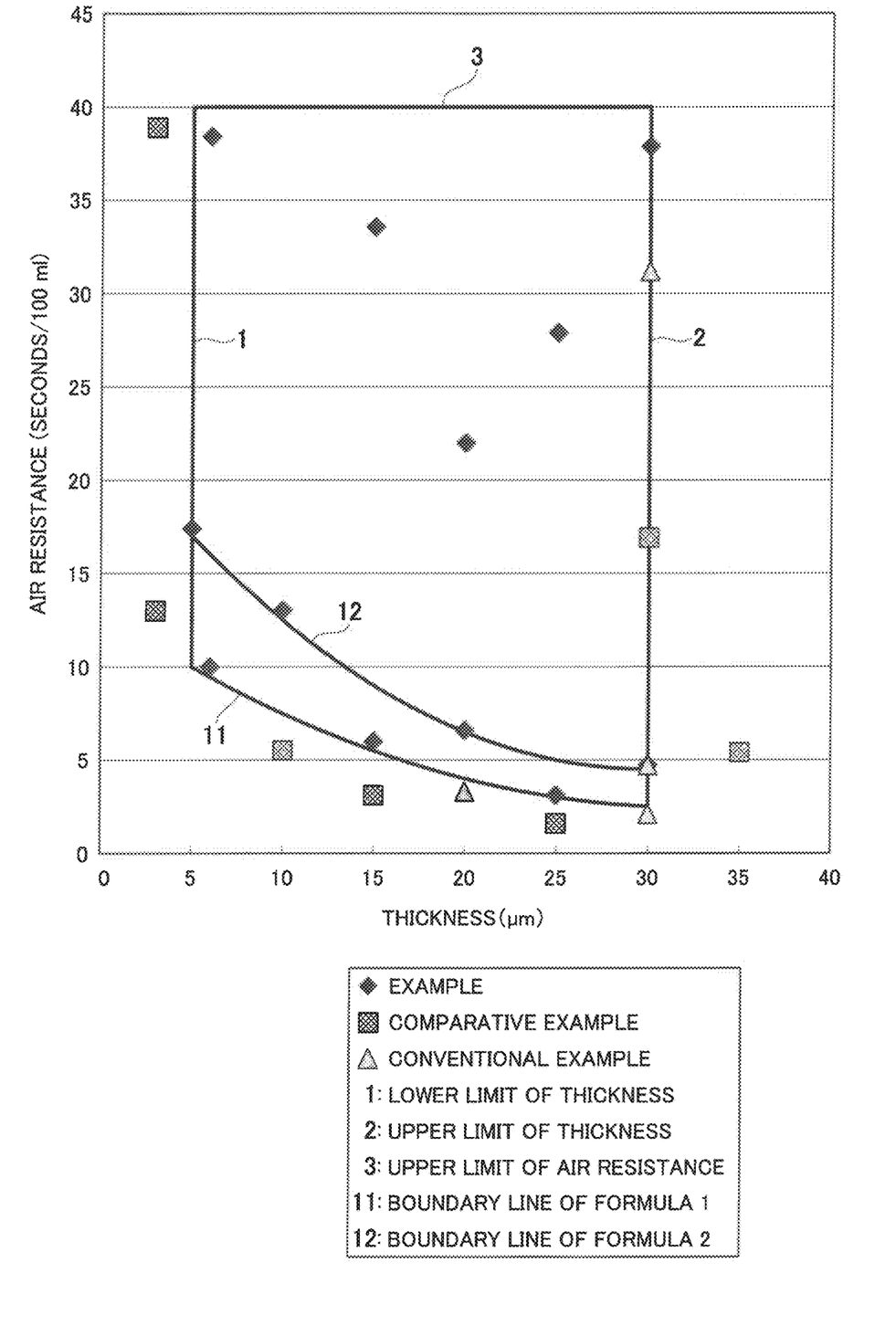
FIG. 1 is a graph comparatively illustrating a relationship between the thickness and the air resistance of each of separators in Examples, Comparative Examples, and Conventional Examples.

FIG. 1 is a graph comparatively illustrating a relationship between the thickness and the air resistance of each of the separators in Examples, Comparative Examples, and Conventional Examples in Table 1. In FIG. 1, line 1 indicates a lower limit of the thickness of the separator of the present invention, line 2 indicates an upper limit of the thickness of the separator of the present invention, line 3 is an upper limit of the air resistance of the separator of the present invention, line 11 indicates a boundary line of formula 1, and line 12 indicates a boundary line of formula 2.

As can be seen from Table 2, the aluminum electrolytic capacitors in Examples did not cause short-circuit failure. The electric double layer capacitors and the lithium ion secondary batteries also had short-circuit failure ratios of less than 0.5%, which is sufficiently low. The impedance and the internal resistivity could be reduced as compared with a conventional electrochemical element. The impregnability was also "○" for all the cases in Examples. Furthermore, the electrostatic capacity change ratios of the aluminum electrolytic capacitors and the electric double layer capacitors in Examples were 20% or less, and the discharge capacity change ratios of the lithium ion secondary batteries in Examples were 30% or less, which are good.

In the separator in Comparative Example 1, the content of the thermoplastic synthetic fiber is as high as 70% by mass, and the content of the cellulose fiber is as low as 30% by mass. Each of electrochemical elements using the separator in Comparative Example 1 caused short-circuit failure even though the Bekk smoothness of the separator was as high as 2361.1 seconds. It is considered that this is because the denseness of the separator was reduced as a result of reduction in the content of the cellulose fiber. In addition, since the Bekk smoothness was high, the impedance and the internal resistivity of each of the electrochemical elements are at the same level as those in each of Conventional Examples, and the capacity change ratio of each of the electrochemical elements after heating was not reduced. It is considered that this is because the retention amount and retainability of an electrolyte solution could not be improved.

From a comparison between Comparative Example 1 and each of Examples, it is found that the content of the thermoplastic synthetic fiber is preferably 50% by mass or less, and the content of the cellulose fiber is preferably 50% by mass or more. It is also found that the Bekk smoothness is preferably 2000 seconds or less.

The separator in Comparative Example 2 has a thickness of 35 μm. For this reason, even though the fibrillation ratio of the separator was as low as 5.5%, the impedance and internal resistivity of each of the electrochemical elements were high, which was at the same level as those in each of Conventional Examples.

In addition, the separator in each of Examples had a higher fibrillation ratio than the separator in Comparative Example 2, and therefore had high retainability of an electrolyte solution and high denseness, and reduced the capacity change ratio after heating and the short-circuit failure ratio.

From a comparison between Comparative Example 2 and each of Examples, it is found that the thickness of the separator is preferably 30.0 μm or less. In addition, it is found that the fibrillation ratio is preferably 7.0% or more.

The separator in Comparative Example 3 has a thickness of 3.0 μm. An electrochemical element using this separator caused short-circuit failure. From a comparison between Comparative Example 3 and each of Examples, it is found that the thickness of the separator is preferably 5.0 μm or more.

The separator in Comparative Example 4 has a thickness of 25.0 μm and an air resistance of 1.6 seconds/100 ml. The separator in Comparative Example 5 has a thickness of 15.0 μm and an air resistance of 3.1 seconds/100 ml. Furthermore, the separator in Comparative Example 6 has a thickness of 10.0 μm and an air resistance of 5.5 seconds/100 ml. The separators in Comparative Examples 4 to 6 do not satisfy the above formula 1.

Electrochemical elements using these separators caused short-circuit failure.

From a comparison between each of Examples and Comparative Examples 4 to 6, it is found that the shielding property of the separator can be improved and the short-circuit failure of the electrochemical element can be reduced by satisfying formula 1.

The separator in Comparative Example 7 has a thickness of 3.0 μm as that in Comparative Example 3. Although this separator has a significantly higher air resistance than that in Comparative Example 3, an electrochemical element using this separator caused short-circuit failure. This indicates that when the thickness of a separator is too thin, the shielding property cannot be improved even if the air resistance of the separator is increased.

The separator in Conventional Example 1 is made of only a cellulose fiber.

From a comparison between Conventional Example 1 and each of Examples, it is found that the capacity change ratio after heating can be reduced by using the separator containing a synthetic fiber according to the present invention. It is considered that this is because chemical stability of the separator against the electrolyte solution was improved by the synthetic fiber. This indicates that the content of the thermoplastic fiber is preferably 10% by mass or more, and the content of the cellulose fiber is preferably 90% by mass or less. The electrochemical element in each of Examples has lower resistivity than the electrochemical element in Conventional Example 1. It is considered that this is because the synthetic fiber moderately inhibited a hydrogen bond of cellulose. Also from this point, it is found that an advantage of containing the synthetic fiber is large.

In addition, the separator in Conventional Example 1 has a low density of 0.40 g/cm$^3$. Therefore, an electric double layer capacitor and a lithium ion secondary battery using this separator caused short-circuit failure.

The separator in Conventional Example 2 is obtained by adjusting the thickness of the separator in Conventional Example 1 by soft calendering. This separator increased an air resistance due to thickness adjustment. However, an electric double layer capacitor and a lithium ion secondary battery using this separator caused short-circuit failure. Here, when the cellulose fiber used for the separators in Conventional Examples 1 and 2 is further beaten to improve short-circuit resistance, it is expected that the resistivity of an electrochemical element will further increase.

The separator in Conventional Example 3 is obtained by micronizing a fiber at a high level in order to increase the denseness, and has a high fibrillation ratio of 25.5%. However, the separator was not subjected to thickness adjustment, and has a low density of 0.40 g/cm$^3$.

The electrochemical element using the separator in each of Examples has a lower short-circuit failure ratio than an electrochemical element using the separator in Conventional Example 3.

From a comparison between Conventional Example 3 and each of Examples, it is found that the density of the separator is preferably 0.50 g/cm$^3$ or more.

The separator in Conventional Example 4 has a density of 1.00 g/cm$^3$. This is because the fibers constituting the separator are partially bonded to each other in a film shape and integrated due to excessive compression. The electrochemical element in Conventional Example 4 has high impedance and internal resistivity. The impregnability of the electrochemical element in Conventional Example 4 is evaluated as "x". From a comparison between Conventional Example 4 and each of Examples, it is found that the density of the separator is preferably 0.75 g/cm$^3$ or less.

The separators in Conventional Examples 5 and 6 are polyethylene microporous films. The separator in Conventional Example 6 increases heat resistance by applying an inorganic substance to the separator in Conventional Example 5. However, the separators in Conventional Examples 5 and 6 did not function as electrochemical elements after the test for the capacity change ratio after heating. Meanwhile, the electrochemical element in each of Examples slightly reduced the capacity by a heat treatment, but operated without any problem.

This indicates that use of the separator containing a cellulose fiber according to the present invention can improve heat resistance of an electrochemical element.

In the separator to which an inorganic powder was applied in Conventional Example 6, the inorganic powder gradually fell off during measurement of the Bekk smoothness, and therefore the Bekk smoothness could not be measured accurately.

For this reason, there is a concern that the inorganic powder may fall off also when such a separator is used as a separator in an electrochemical element.

When Examples 1 to 9 are compared with Examples 10 to 12, each of the electrochemical elements in Examples 1 to 9 caused no short-circuit failure, whereas the electric double layer capacitors and the lithium ion secondary batteries in Examples 10 to 12 slightly caused short-circuit failure.

Each of the separators in Examples 1 to 9 is a separator having a Bekk smoothness of 500 seconds or more and an extremely high denseness in a plane direction, and is a separator having a good shielding property and satisfying formula 2.

This indicates that the shielding property of a separator can be further improved by satisfying not only formula 1 but also formula 2.

In FIG. 1, the boundary line (11) of formula 1 extends along the values in Examples 10 to 12 and immediately below the values in these Examples. The boundary line (12) in formula 2 extends along the values in Examples 1, 2, and 5 and immediately below the values in these Examples.

From the evaluation results of Examples 10 to 12 near the boundary line 11 of formula 1 and the evaluation results of Comparative Examples 4 to 6 below the boundary line 11 of formula 1 in FIG. 1, it is found that short-circuit failure can be reduced by satisfying formula 1. From the evaluation results of Examples 1, 2, and 5 near the boundary line 12 of formula 2 and the evaluation results of Examples 10 to 12 below the boundary line 12 of formula 2, it is found that short-circuit failure can be further reduced by satisfying formula 2.

As described above, the separator of the present invention is a separator for electrochemical elements, characterized in that the separator has a thickness of 5.0 to 30.0 μm and a density of 0.50 to 0.75 g/cm$^3$, and a thickness X (μm) and an air resistance Y (second/100 ml) satisfy the following formula 1.

$$Y \geq 0.01X^2 - 0.6X + 11.5 \qquad \text{Formula 1:}$$

The separator in each of Examples has a thickness smaller than many conventional separators, that is, the separator is thin, but has a low short-circuit failure ratio.

Use of the separator of the present invention can improve short-circuit resistance and can reduce the thickness without impairing the resistivity of the separator, the electrolyte solution impregnability, and the electrolyte solution retainability, and can further contribute to reduction in the size of an electrochemical element.

An example in which the separator of the present embodiment is used for an aluminum electrolytic capacitor, an electric double layer capacitor, and a lithium ion secondary battery has been described above.

In the electrochemical element according to the present invention, for an electrode material, an electrolyte solution material, other members, and the like, various materials can be used without any particular limitation.

In addition, the separator for electrochemical elements according to the present invention can also be applied to an electrochemical element other than those described in the present embodiment, for example, a lithium ion capacitor, a lithium primary battery, a sodium ion secondary battery, a sodium sulfur secondary battery, a magnesium ion secondary battery, or a magnesium sulfur secondary battery.

REFERENCE SIGNS LIST

1 Lower limit of thickness
2 Upper limit of thickness
3 Upper limit of air resistance
11 Boundary line of formula 1
12 Boundary line of formula 2

The invention claimed is:

1. A separator for electrochemical elements, interposed between a pair of electrodes so as to separate the electrodes from each other and holding an electrolyte solution, the separator consisting of a beaten cellulose fiber and a thermoplastic synthetic fiber, wherein the separator has a thickness of 5.0 to 30.0 μm, a density of 0.50 to 0.75 g/cm³, and an air resistance of 10 to 40 seconds/100 ml, and wherein a following formula 2 is satisfied:

$$Y \geq 0.02X^2 - 1.2X + 22.5;$$ Formula 2 wherein X (μm) is the thickness of the separator and Y (second/100 ml) is the air resistance of the separator.

2. The separator for electrochemical elements according to claim 1, wherein a content of the cellulose fiber in the fibers is 50 to 90% by mass, and a content of the thermoplastic synthetic fiber is 10 to 50% by mass.

3. The separator for electrochemical elements according to claim 1, wherein the cellulose fiber is a solvent-spun cellulose fiber.

4. The separator for electrochemical elements according to claim 1, wherein the thermoplastic synthetic fiber is at least one selected from the group consisting of a polyester-based fiber, a polyolefin-based fiber, and an acrylic fiber.

5. An electrochemical element, comprising:
the separator according to claim 1;
the pair of electrodes, and
the electrolyte solution.

6. The electrochemical element according to claim 5, which is selected from the group consisting of an aluminum electrolytic capacitor, an electric double layer capacitor, a lithium ion capacitor, a lithium ion secondary battery, a sodium ion secondary battery, a sodium sulfur secondary battery, a magnesium ion secondary battery, and a magnesium sulfur secondary battery.

* * * * *